United States Patent
Noba et al.

(10) Patent No.: US 11,511,621 B2
(45) Date of Patent: Nov. 29, 2022

(54) FUEL TANK UNITS

(71) Applicant: AISAN KOGYO KABUSHIKI KAISHA, Obu (JP)

(72) Inventors: Junichi Noba, Yatomi (JP); Kensuke Niwa, Nagoya (JP); Tetsumasa Kawakami, Okazaki (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 155 days.

(21) Appl. No.: 17/002,740

(22) Filed: Aug. 25, 2020

(65) Prior Publication Data

US 2021/0061090 A1   Mar. 4, 2021

(30) Foreign Application Priority Data

Aug. 26, 2019   (JP) ............................. JP2019-153673

(51) Int. Cl.
*B60K 15/00* (2006.01)
*B60K 15/035* (2006.01)
(52) U.S. Cl.
CPC .............................. *B60K 15/03519* (2013.01)
(58) Field of Classification Search
CPC .... B60K 15/03519; B60K 2015/03243; B60K 2015/03453; B60K 2015/03467; F02M 37/0023; F02M 37/0082; F02M 37/10
See application file for complete search history.

(56) References Cited

U.S. PATENT DOCUMENTS

| 5,762,049 A * | 6/1998 | Jones | F02M 37/10 123/514 |
| 10,544,762 B2 * | 1/2020 | Fukui | F02M 37/106 |
| 10,850,606 B2 * | 12/2020 | Niwa | B65D 51/16 |
| 2017/0268470 A1 * | 9/2017 | Murakoshi | F02M 37/00 |
| 2018/0031408 A1 * | 2/2018 | Flynn | F02M 37/0076 |
| 2019/0024617 A1 * | 1/2019 | Fukui | F02M 37/103 |
| 2019/0047405 A1 * | 2/2019 | Niwa | B60K 15/03504 |
| 2019/0331073 A1 * | 10/2019 | Higashi | F02M 37/04 |

FOREIGN PATENT DOCUMENTS

| CN | 205266067 U | 5/2016 |
| JP | 2017129072 A | 7/2017 |
| JP | 2017145802 A | 8/2017 |

OTHER PUBLICATIONS

Chinese Office Action dated Dec. 18, 2021, for Chinese Application No. 202010851171.0 (4 p.).
English Translation of Chinese Office Action dated Dec. 18, 2021, for Chinese Application No. 202010851171.0 (6 p.).

* cited by examiner

*Primary Examiner* — Phutthiwat Wongwian
*Assistant Examiner* — Sherman D Manley
(74) *Attorney, Agent, or Firm* — Conley Rose, P.C.

(57) ABSTRACT

A fuel tank unit includes a lid member configured to close an opening formed on a fuel tank. The fuel tank also includes an upper unit attached to the lid member and including a combination valve device configured to be introduced into the fuel tank via the opening formed on the fuel tank and configured to function as an evaporated fuel control valve and a full limit valve. The lid member includes a cylindrical protective case configured to protect the combination valve device of the upper unit when the combination valve device is introduced into the fuel tank via the opening. The protective case is configured to entirely enclose an outer circumferential surface of the combination valve device with a space therebetween.

5 Claims, 9 Drawing Sheets

FUEL TANK UNITS

CROSS-REFERENCE TO RELATED APPLICATIONS

This application claims priority to Japanese patent application serial number 2019-153673 filed Aug. 26, 2019, which is hereby incorporated herein by reference in its entirety for all purposes.

BACKGROUND

The present disclosure relates generally to a fuel tank unit. More particularly, the present disclosure relates to a fuel tank unit for an automobile or other such vehicle, which includes a fuel tank and a fuel-feeding device disposed in the fuel tank.

An automobile or other such vehicle includes a fuel tank configured to store fuel (gasoline) to be fed to an internal-combustion engine (a gasoline engine). A fuel-feeding device for feeding the fuel to the internal-combustion engine is disposed in the fuel tank. Collectively, the fuel tank and the fuel-feeding device form a fuel tank unit. The fuel-feeding device is typically introduced into the fuel tank via an opening formed in the fuel tank, so as to be disposed therein.

SUMMARY

For example, in one aspect of the present disclosure, a fuel tank unit may includes a lid member that is configured to close an opening formed on a fuel tank, and an upper unit attached to the lid member and including a combination valve device that is configured to be introduced into the fuel tank via the opening formed on the fuel tank and is configured to function as an evaporated fuel control valve and a full limit valve. The lid member is provided with a cylindrical protective case that is configured to protect the combination valve device of the upper unit when the combination valve device is introduced into the fuel tank via the opening. The protective case is configured to entirely enclose an outer circumferential surface of the combination valve device with a space therebetween.

According to the fuel tank unit thus constructed, the protective case may circumferentially enclose the combination valve device. Therefore, when the upper unit (the combination valve device) is introduced into the fuel tank via the opening, the combination valve device may be prevented from directly contacting a periphery of the opening, so as to be prevented from being damaged. Further, the protective case is positioned around the combination valve device with a space therebetween. Therefore, even if the protective case is deformed by an external force applied thereto when the upper unit is introduced into the fuel tank, the combination valve device may be effectively protected.

Other objects, features, and advantages, of the present disclosure will be readily understood after reading the following detailed description together with the accompanying drawings and the claims.

DETAILED DESCRIPTION

As previously described, the fuel-feeding device is typically introduced into the fuel tank via an opening formed in the fuel tank to position the fuel-feeding device within the fuel tank and form the fuel tank unit. One known fuel-feeding device to be disposed in a fuel tank is taught by, for example, Japanese Laid-Open Patent Publication No. 2017-145802 (JP2017-145802A). This fuel-feeding device includes an upper unit attached to a lid member configured to close an opening formed in the fuel tank, and a lower unit positioned below the upper unit. Further, the upper unit and the lower unit may respectively be referred to as a flange unit and a pump unit. The upper unit (i.e., the flange unit) includes a combination valve device having an evaporated fuel control valve and a full limit valve. Conversely, the lower unit (the pump unit) includes various components constituting the fuel-feeding device (e.g., a sub tank, a fuel pump horizontally positioned above the sub tank, and joint members). Further, the combination valve device of the upper unit is attached to the lid member by a snap-fit engagement structure. Further, the sub tank of the lower unit includes a tank body, a fuel filter and a bottom cover. However, according to this known fuel-feeding device, the combination valve device of the upper unit is attached to the lid member in a condition in which it is exposed. Therefore, when the fuel-feeding device is introduced into the fuel tank via the opening of the fuel tank to form the fuel tank unit, the combination valve device may inadvertently and directly contact a periphery of the opening. Thus, there is a need in the art for an improved fuel tank unit in which a fuel-feeding device for feeding fuel to an engine is disposed in a fuel tank.

Next, a representative embodiment of the present disclosure will be described with reference to the drawings.

Figure 1:
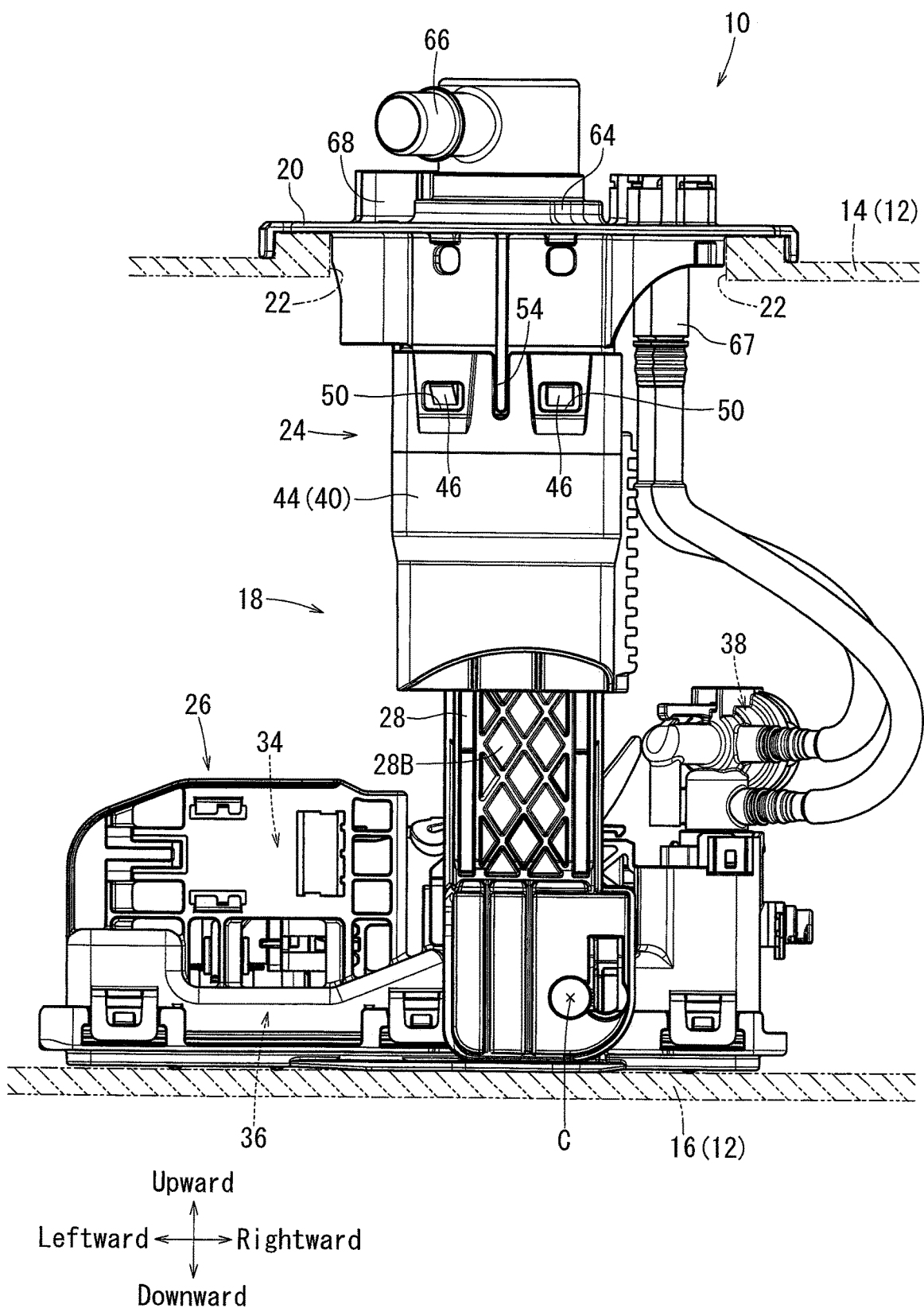
FIG. 1 is a partial cross-sectional front elevational view of an embodiment of a fuel-feeding device in accordance with principles described herein, which illustrates a condition in which a fuel-feeding device is disposed in a fuel tank.

Referring first to FIG. 1, an embodiment of a fuel tank unit 10 for a vehicle such as an automobile is shown. In this embodiment, the fuel tank unit 10 includes a fuel tank 12 and a fuel-feeding device 18 disposed in the fuel tank 12. The fuel-feeding device 18 is configured to supply or feed fuel to an engine (an internal-combustion engine). Further, forward, backward, rightward, leftward, upward and downward directions described with reference to the figures may be defined simply for descriptive purposes. Therefore, such directions may not respectively correspond to forward, backward, rightward, leftward, upward and downward directions of the vehicle to which the fuel tank 12 (the fuel tank unit 10) is attached.

Figure 2:
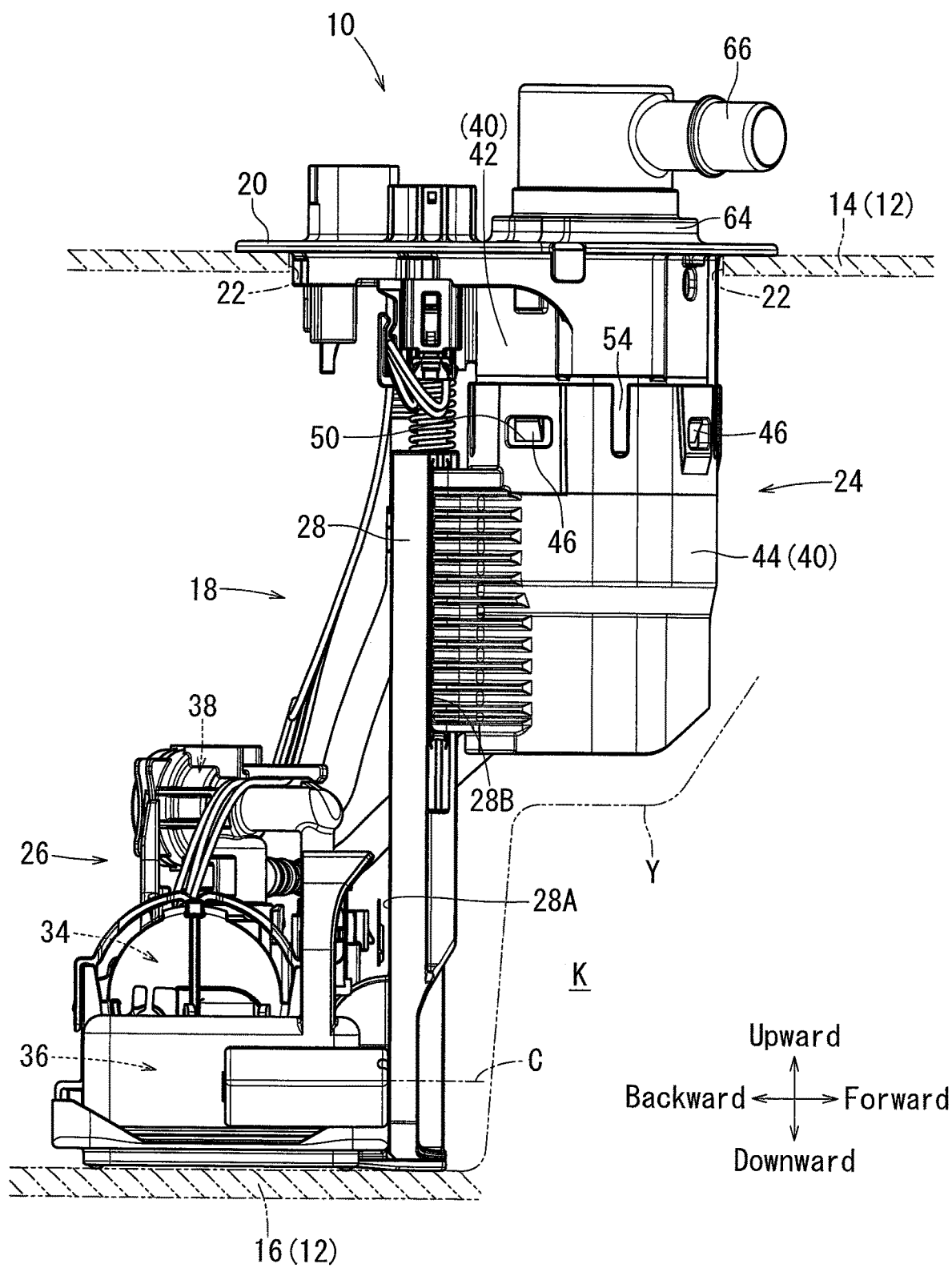
FIG. 2 is a partial cross-sectional side view of the fuel-feeding device of FIG. 1, which illustrates the condition in which the fuel-feeding device is disposed in the fuel tank.

As shown in FIGS. 1 and 2, the fuel tank 12 is as a hollow container having an upper wall portion 14 and a lower wall portion 16 that are substantially parallel to each other. The fuel tank 12 may generally contain liquid fuel or gasoline, such that the fuel-feeding device 18 disposed therein can feed the gasoline to the engine. The fuel tank 12 is preferably be attached to the vehicle such that the upper wall portion 14 and the lower wall portion 16 are substantially horizontally positioned.

The fuel tank 12 may be made of resin so as to be deformable in response to a change in an inner pressure of the fuel tank 12. In particular, when the inner pressure of the fuel tank 12 is increased, the upper wall portion 14 of the fuel tank 12 may bow or swell outward and upward while the lower wall portion 16 of the fuel tank 12 may bow or swell outward and downward. To the contrary, when the inner pressure of the fuel tank 12 is reduced, the upper wall portion 14 of the fuel tank 12 may deflect or bow inward and downward while the lower wall portion 16 of the fuel tank 12 may deflect or bow inward and upward.

As shown in FIGS. 1 and 2, the fuel tank 12 has a substantially circular opening 22 formed in upper wall portion 14 thereof. The opening 22 is sized and configured such that the fuel-feeding device 18 can be introduced into the fuel tank 12 therethrough. Further, the fuel tank 12 includes a substantially circular lid member 20 that is configured to close the opening 22 of the fuel tank 12. Similar to the fuel tank 12, the lid member 20 may be made of resin.

Figure 3:
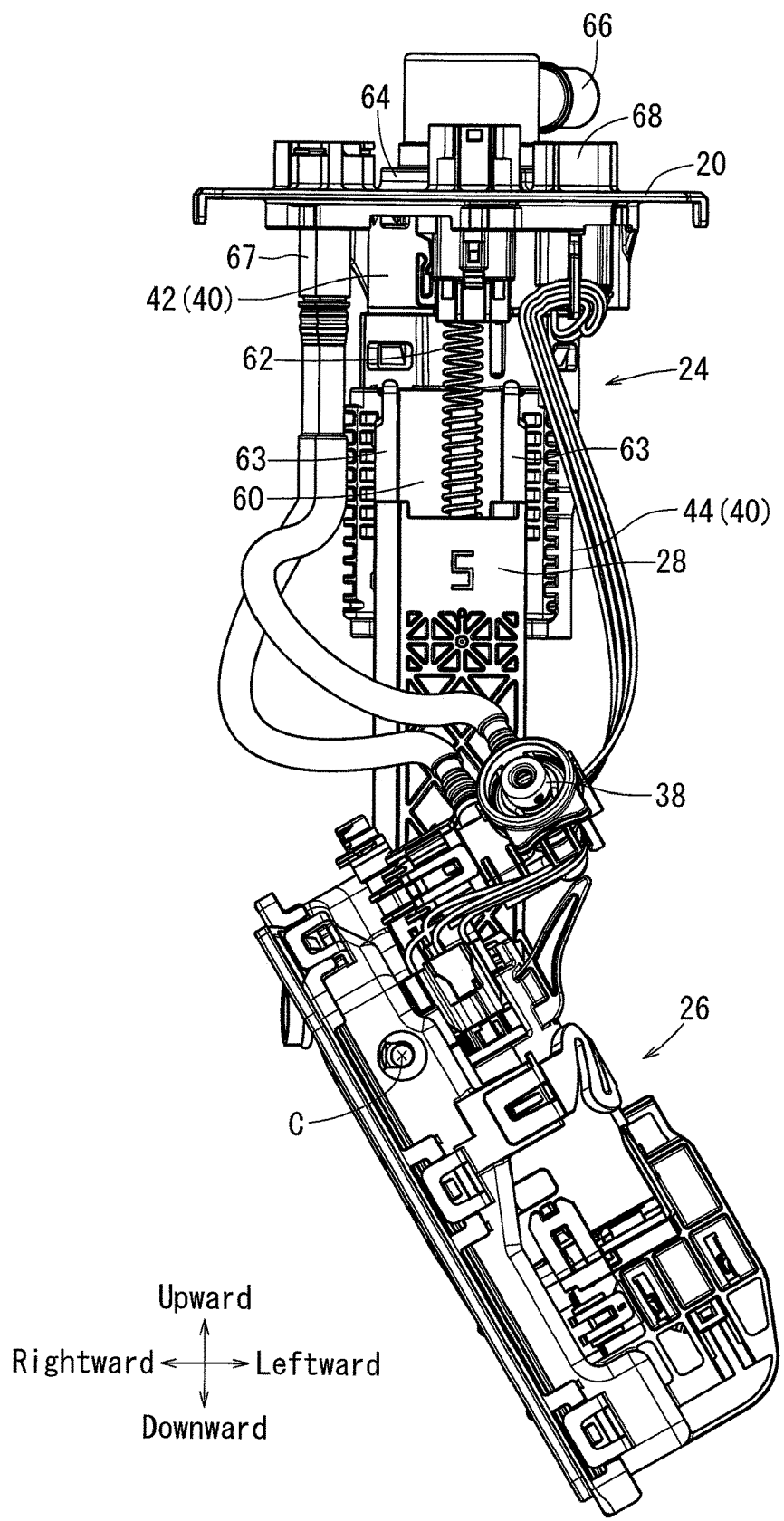
FIG. 3 is a rear elevational view of the fuel-feeding device of FIG. 1, which illustrates a position at a time when the fuel-feeding device attached to a lid member is introduced into the fuel tank of FIG. 1 via an opening formed in the fuel tank.

Referring now to FIG. 3, the fuel-feeding device 18 to be disposed in the fuel tank 12 is attached to the lid member 20. In particular, the fuel-feeding device 18 includes an upper (first) unit 24 and a lower (second) unit 26. The upper unit 24 is attached to the lid member 20, which is described in more detail below. The lower unit 26 is coupled to the upper unit 24 via a connecting member 28, which will be described in more detail below. As a result, the upper unit 24 and the lower unit 26 are coupled to the lid member 20 as a whole. Thus, the fuel-feeding device 18 (the upper unit 24 and the lower unit 26) may be integrated with the lid member 20, so as to form a combination of the fuel-feeding device 18 and the lid member 20. Further, the upper unit 24 and the lower unit 26 may respectively be referred to as a flange unit and a pump unit. Further, the lid member 20 may be referred to as a setting plate.

The upper unit 24 of the fuel-feeding device 18 includes a combination valve device 30 (FIG. 7) having a cylindrical shape and being vertically positioned relative to the lid member 20. The combination valve device 30 is connected to the lid member 20 so that the upper unit 24 is attached to the lid member 20. The combination valve device 30 is a valve device configured to function as an evaporated fuel control valve and a full limit valve. The evaporated fuel control valve is configured to be closed when the inner pressure of the fuel tank 12 is less than a predetermined value and opened when the inner pressure of the fuel tank 12 is greater than the predetermined value. Thus, the evaporated fuel control valve functions to feed evaporated fuel generated in the fuel tank 12 to an intake duct via a canister (not shown). Further, the full limit valve is configured to be opened when the fuel tank 12 is not filled up and closed when the fuel tank 12 reaches a filled-up condition.

As shown in FIGS. 1, 2 and 4-6, the fuel tank unit 10 includes a protective case 40 having a substantially cylindrical shape. In this embodiment, the protective case 40 entirely encloses (encircles) an outer circumferential surface of the combination valve device 30 with a annular clearance or space disposed therebetween. Further, the protective case 40 is attached to (integrated with) the lid member 20. Further, as shown in FIG. 2, the protective case 40 is vertically slidably connected to an upper end of the connecting member 28.

As shown in FIGS. 1 and 2, the lower unit 26 of the fuel-feeding device 18 may be positioned below the upper unit 24 attached to the lid member 20. In this embodiment, the lower unit 26 is connected to the upper unit 24 by the connecting member 28 while the lower unit 26 is vertically spaced away from the upper unit 24. Further, as shown in FIG. 2, the lower unit 26 is positioned across the connecting member 28 from the upper unit 24. That is, the lower unit 26 and the upper unit 24 are respectively positioned on opposite sides of the connecting member 28. In particular, the lower unit 26 is connected to a first attachment surface (side) 28A of the connecting member 28, whereas the upper unit 24 (the protective case 40) is connected to a second (opposite) attachment surface (side) 28B of the connecting member 28.

As described above, the upper unit 24 and the lower unit 26 are laterally offset relative to each other (FIG. 2). As a result, the fuel-feeding device 18 has a substantial space K that is formed under the upper unit 24. Therefore, the fuel tank 12 can be relatively freely designed in shape. In particular, as shown in FIG. 2, the fuel tank 12 can be shaped so as to have a profile shown by a chain double dashed line Y. The fuel tank 12 having such a profile has a free space corresponding to the space K. Therefore, such a free space may be beneficially used as a space in which various equipments and devices are disposed.

As shown in FIGS. 1 and 2, the lower unit 26 include various components, e.g., a fuel pump 34, a pressure regulator 38 coupled to the fuel pump 34, a sub tank 36 and a (fuel) sender gauge (not shown). These components may be referred to as fuel-feeding components. Further, the fuel pump 34 is horizontally positioned on and connected to the sub tank 36. Further, the sub tank 36 includes a tank main body, a fuel filter, and a bottom cover.

As shown in FIGS. 1 and 2, the lower unit 26 is rotatably connected to a lower end of the connecting member 28, so as to be rotatable about a rotation axis C perpendicular to the first and second attachment surfaces 28A, 28B. Preferably, the sub tank 36 of the lower unit 26 is rotatably connected to the connecting member 28. Further, as shown in FIG. 1, the rotation axis C is laterally (rightward) displaced or offset in the lower unit 26. That is, as shown in FIG. 3, the lower unit 26 is rotatably connected to the connecting member 28 such that the left side of the lower unit 26 may be rotated downward about the rotation axis C under its own weight.

Figure 4:
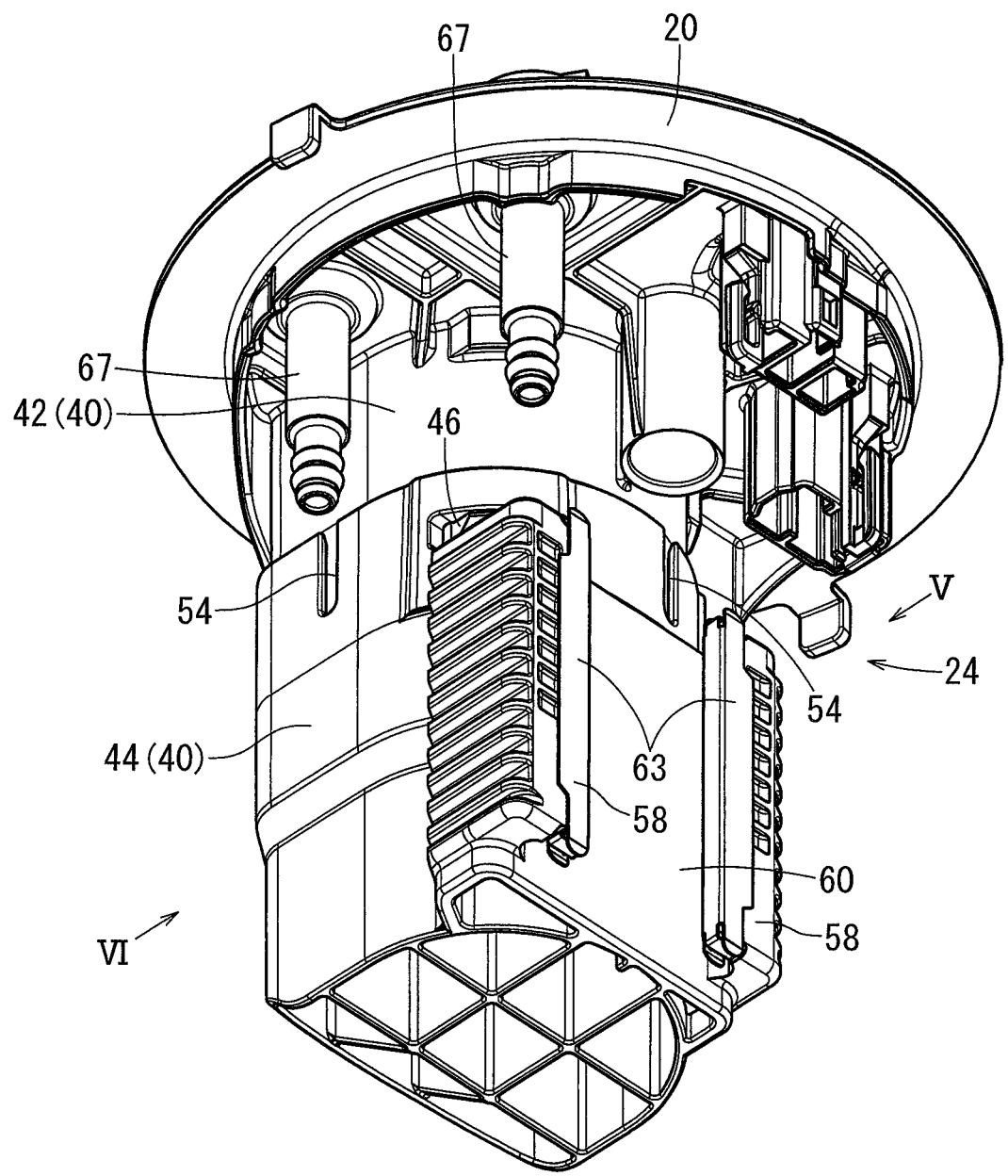
FIG. 4 is a partially perspective view of the fuel-feeding device attached to the lid member viewed from below, which illustrates a condition in which a lower unit of the fuel-feeding device is omitted.
Figure 5:
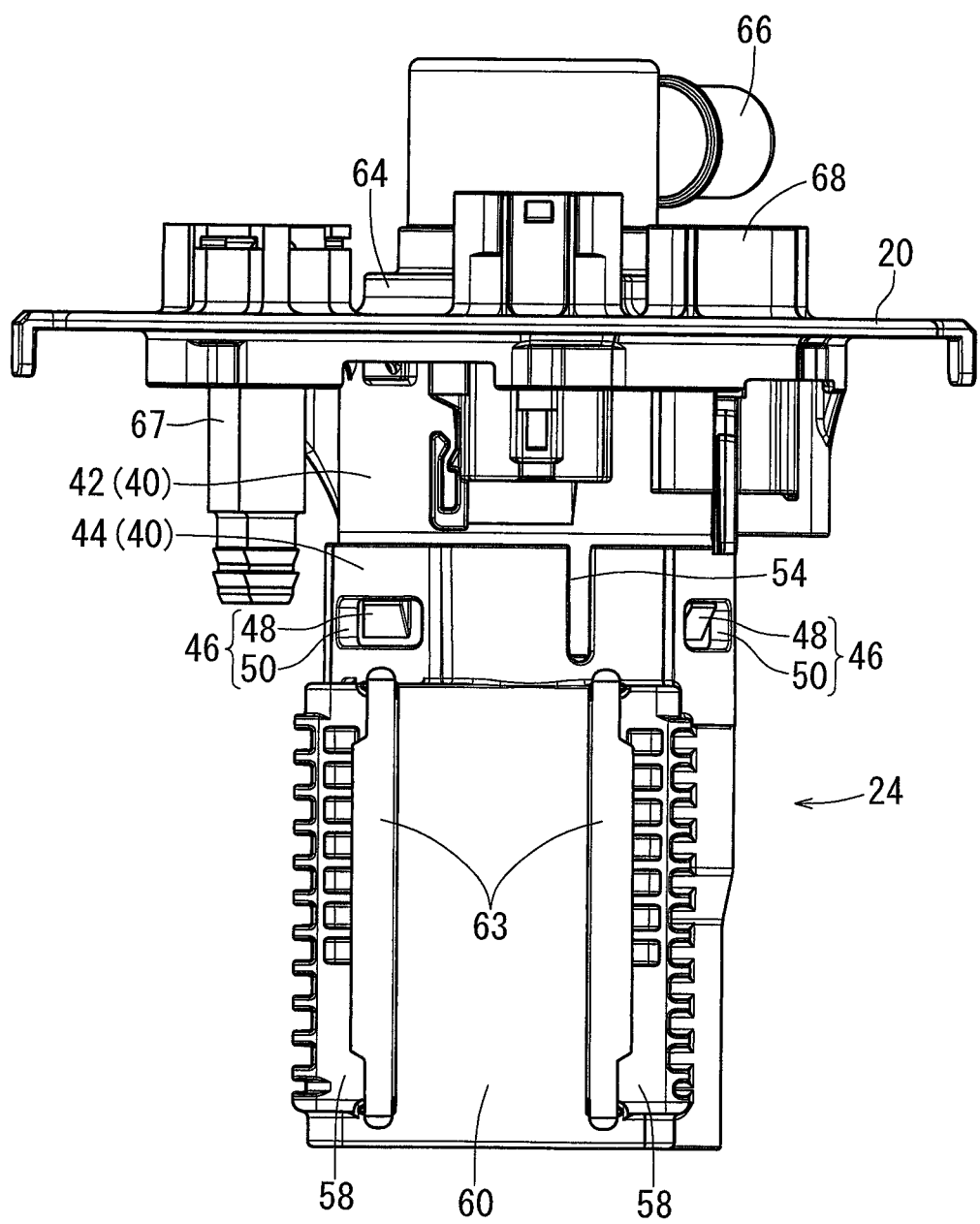
FIG. 5 is a rear elevational view of the fuel-feeding device and the lid member of FIG. 4 as viewed from a direction of arrow V in FIG. 4.
Figure 6:
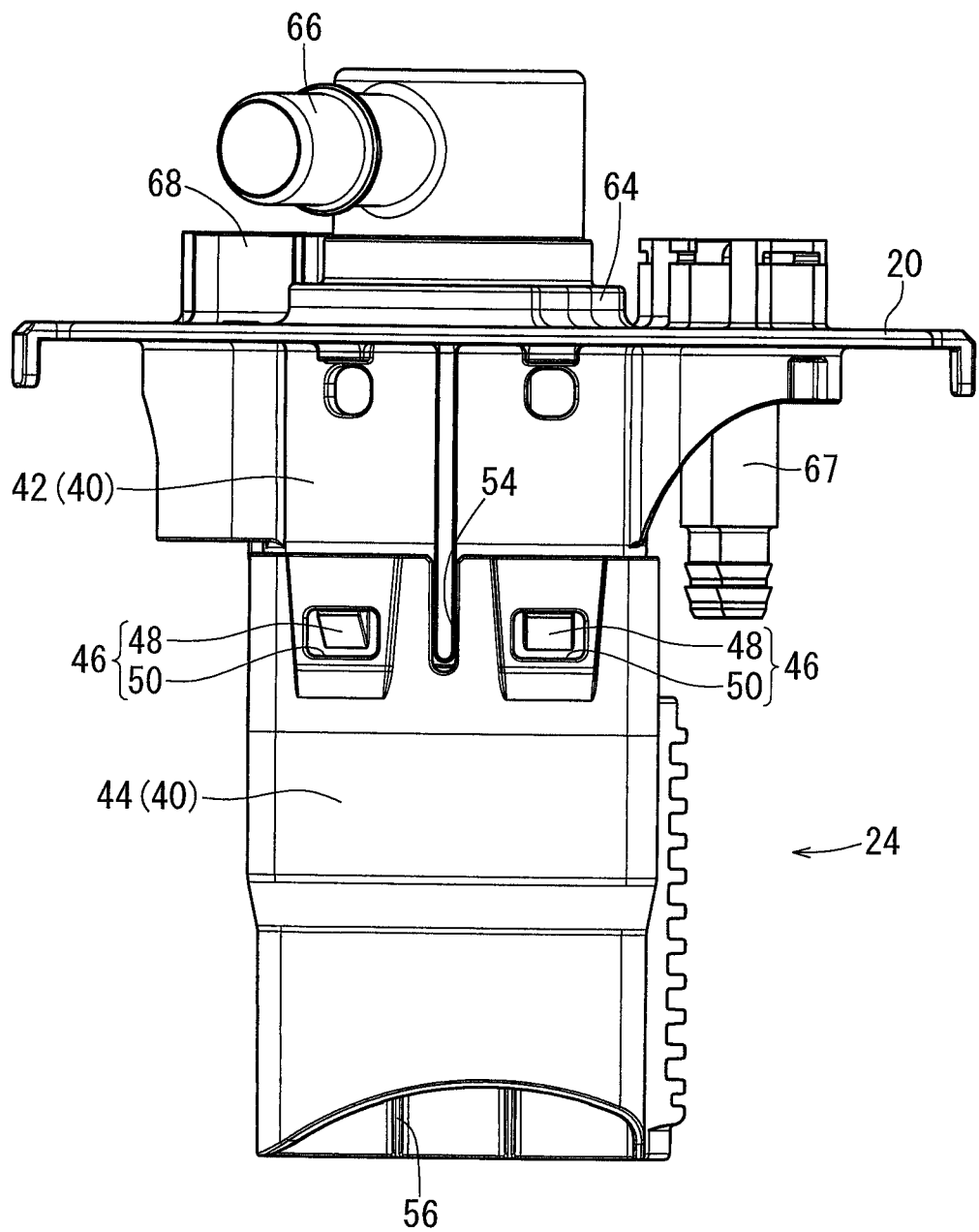
FIG. 6 is a front elevational view of the fuel-feeding device and the lid member of FIG. 4 as viewed from a direction of arrow VI in FIG. 4.

Next, the protective case 40 will be described in detail. As shown in FIGS. 4 to 6, the protective case 40 is vertically divided. That is, the protective case 40 includes cylindrical upper portion and a cylindrical lower portion, an upper (first) protective case element 42 and a lower (second) protective case element 44. The protective case 40 (including the upper protective case element 42 and the lower protective case element 44) may be made of resin. Further, the upper protective case element 42 may be formed integrally with the lid member 20 by resin molding. That is, the upper protective case element 42 may be integrally connected to the lid member 20.

As shown in FIG. 6, the lower protective case element 44 is coupled to the upper protective case element 42 by mating engagement, thereby forming the protective case 40. In particular, the upper protective case element 42 is a relatively small diameter cylindrical member, whereas the lower protective case element 44 is a relatively large diameter cylindrical member. The lower protective case element 44 is coupled to the upper protective case element 42 in a condition in which an upper portion (an upper inner circumferential surface) of the lower protective case element 44 overlaps a lower portion (a lower outer circumferential surface) of the upper protective case element 42 from outside. That is, the lower protective case element 44 is coupled to the upper protective case element 42 in a condition in which an upper annular periphery of the lower protective case element 44 is exposed on the outside of the protective case 40. Accordingly, the protective case 40 includes an annular, upward facing shoulder.

Figure 7:
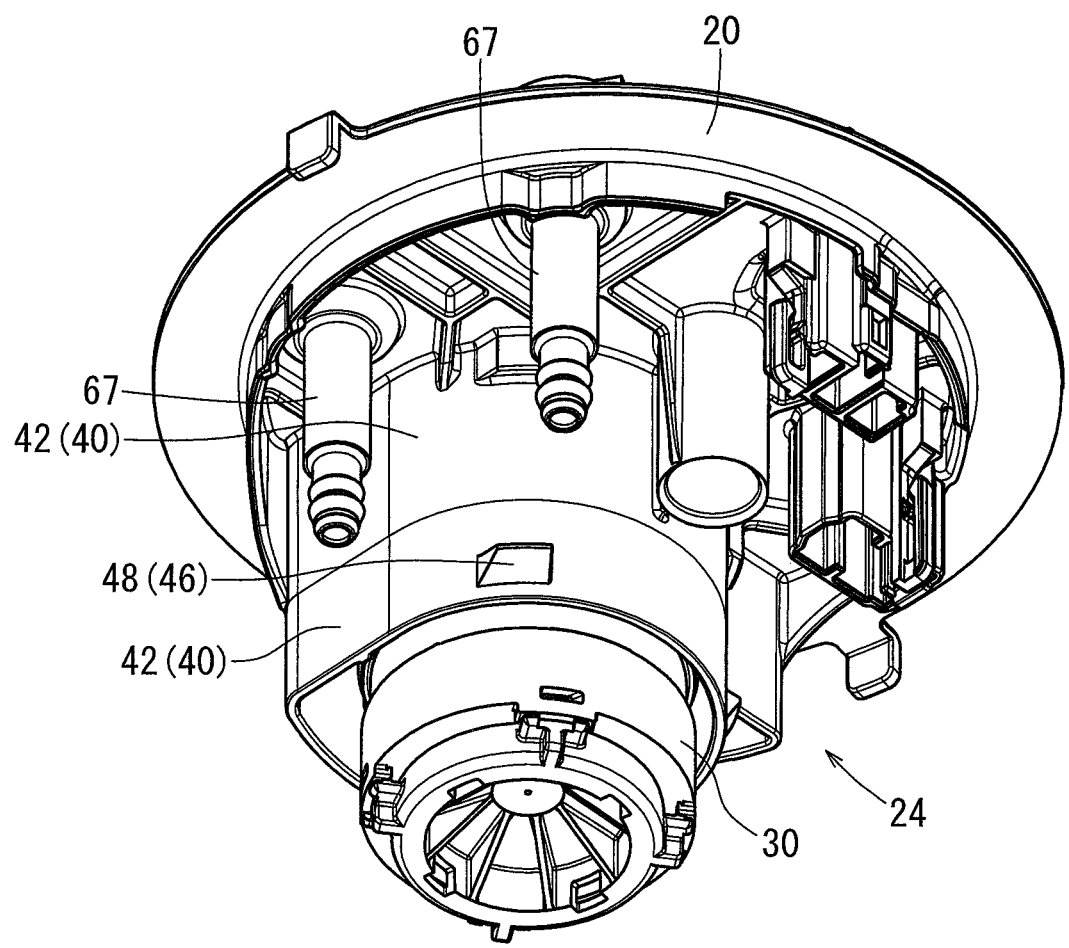
FIG. 7 is a view of the fuel-feeding device and the lid member similar to FIG. 4, which illustrates a condition in which a lower protective case element is removed.
Figure 8:
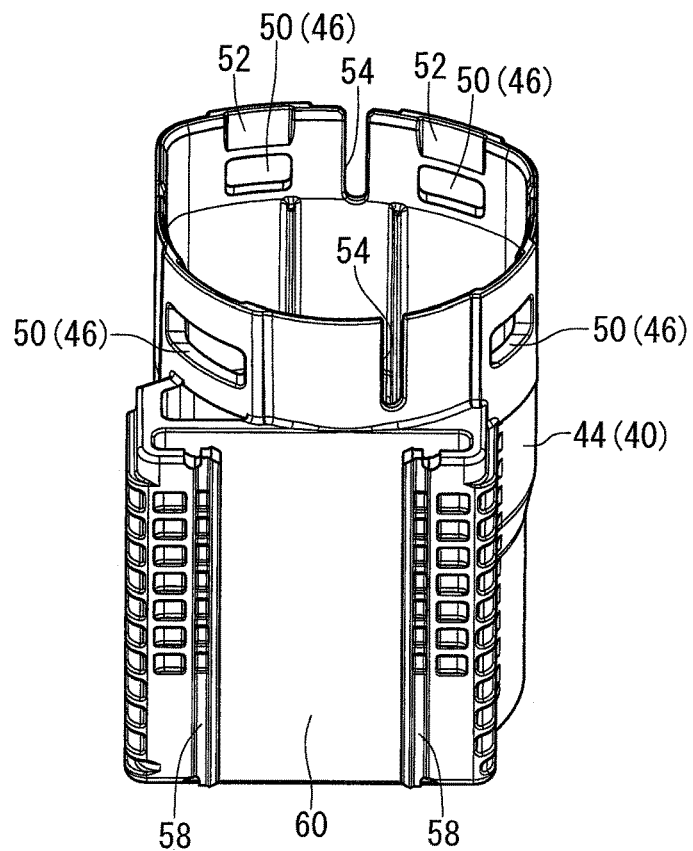
FIG. 8 is a perspective view of the lower protective case element of FIG. 4 as viewed from above.

The lower protective case element 44 is coaxially and rotationally aligned relative to the upper protective case element 42, and connected to the upper protective case element 42 with a snap-fit connecting structure 46. In particular, as shown in FIG. 7, the upper protective case element 42 includes a plurality of (four in this embodiment) engagement claws 48. Conversely, as shown in FIG. 8, the lower protective case element 44 includes a plurality of (four in this embodiment) engagement slots 50 configured to engage the engagement claws 48. Upon engagement of the engagement claws 48 and the engagement slots 50, the lower protective case element 44 is releasably coupled to the upper protective case element 42. Further, the snap-fit connecting structure 46 may be configured to have a degree of looseness or backlash. In particular, the engagement slots 50 may be configured to loosely engage the engagement claw 48.

As shown in FIG. 7, the engagement claws 48 are circumferentially formed along an outer circumferential surface of the lower portion of the upper protective case element 42 at circumferentially-spaced intervals. Each of the engagement claws 48 has a triangular shape in vertical cross section, so as to have an upper horizontal surface and a lower inclined surface that is inclined upward.

Conversely, as shown in FIG. 8, the engagement slots 50 are circumferentially formed in the upper portion of the lower protective case element 44 at circumferentially-spaced intervals corresponding to the intervals of the engagement claws 48. Further, as shown in FIG. 8, the lower protective case element 44 includes a plurality of guide recesses 52 formed in a periphery of the upper portion thereof. The guide recesses 52 are respectively positioned so as to be vertically aligned with the engagement slots 50. Further, each of the guide recesses 52 is configured to have an inclined surface that is inclined upward and outward. In other words, each of the guide recesses 52 is configured to be reduced downward in depth.

Further, as shown in FIG. 8, the lower protective case element 44 has a plurality of open-ended vertical slots 54 formed in the upper portion thereof. The vertical slots 54 are respectively positioned between the engagement slots 50. The vertical slots 54 function to allow the upper portion of the lower protective case element 44 to flex radially outward.

Figure 9:
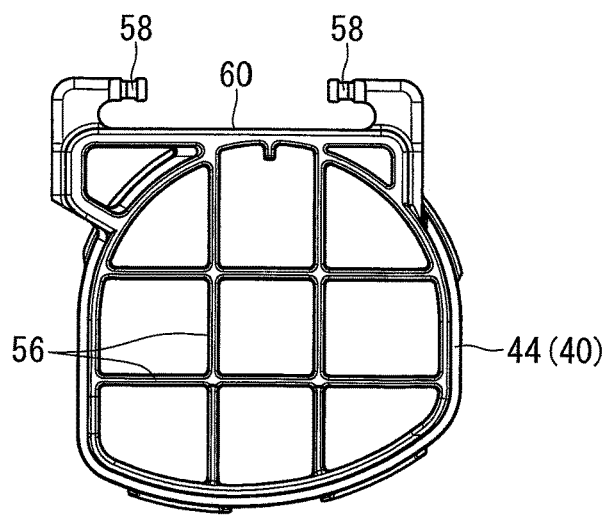
FIG. 9 is a bottom view of the lower protective case element of FIG. 4.

Further, as shown in FIG. 9, the lower protective case element 44 has a lattice-shaped ribs 56 formed in a lower portion thereof. The ribs 56 function to reinforce the lower portion of the lower protective case element 44, so as to prevent the lower protective case element 44 from deforming inward when an external force is applied thereto.

In order to form the protective case 40, the lower protective case element 44 is pressed to the upper protective case element 42 integrally connected to the lid member 20 while the guide recesses 52 of the lower protective case element 44 are aligned with the engagement claws 48 of the upper protective case element 42. As a result, the lower portion of the upper protective case element 42 is introduced into the upper portion of the lower protective case element 44 while the engagement claws 48 of the upper protective case element 42 are guided by the guide recesses 52 of the lower protective case element 44. Thereafter, the lower protective case element 44 is pressed to the upper protective case element 42 until the engagement claws 48 engage the engagement slots 50 of the lower protective case element 44. Upon engagement of the engagement claws 48 and the engagement slots 50, the lower protective case element 44 is coupled to the upper protective case element 42 while the lower protective case element 44 is axially and rotationally aligned relative to the upper protective case element 42. Thus, the protective case 40 that is integrally connected to the lid member 20 is formed (FIGS. 4 to 6). Further, when the lower protective case element 44 is pressed to the upper protective case element 42, the lower portion of the upper protective case element 42 is easily and smoothly introduced into the upper portion of the lower protective case element 44 because the upper portion of the lower protective case element 44 may flex radially outward due to the vertical slots 54 formed therein.

As previously described, the protective case 40 is vertically slidably connected to the upper end of the connecting member 28. In particular, as shown in FIG. 8, the lower protective case element 44 of the protective case 40 has a rail member formed in a portion (back portion) of an outer circumferential surface thereof and vertically extending therealong. The rail member includes a pair of (right and left) vertical rail portions 58 laterally oppositely positioned and a plate-shaped base portion 60 connecting the rail portions 58. In this embodiment, each of the rail portions 58 has a U-shape in cross section. Therefore, the rail member may be described as having a C-shape in cross section as a whole.

As shown in FIGS. 4 and 5, the rail members 58 have a pair of elongated slipping members 63 attached thereto. In particular, the slipping members 63 are respectively longitudinally attached to vertical end edges of the rail members 58 by mating engagement.

As shown in FIG. 3, the upper end of the connecting member 28 is vertically inserted into the rail member while contacting the slipping members 63 attached to the rail portions 58. This means that the upper end of the connecting member 28 are vertically slidably connected to the rail portions 58 via the slipping members 63. That is, the connecting member 28 is connected to the rail portions 58 so as to be vertically movable relative thereto. This means that the connecting member 28 may be vertically slidably connected to the protective case 40 (the lower protective case element 44). Thus, the lower unit 26 is vertically movably connected to the upper unit 24 via the connecting member 28.

Further, as shown in FIG. 3, a compression coil spring 62 is positioned between an upper end surface of the connecting member 28 and the lid member 20. As a result, the connecting member 28 is normally biased or pressed downward relative to the lid member 20 (the upper unit 24) due to a spring force of the compression coil spring 62. In other words, the upper unit 24 and the lower unit 26 are normally maximally spaced away from each other. Therefore, when the upper unit 24 and/or the lower unit 26 is not applied with a vertical external force, the connecting member 28 is held in its lowermost position (FIG. 3).

Figure 10:
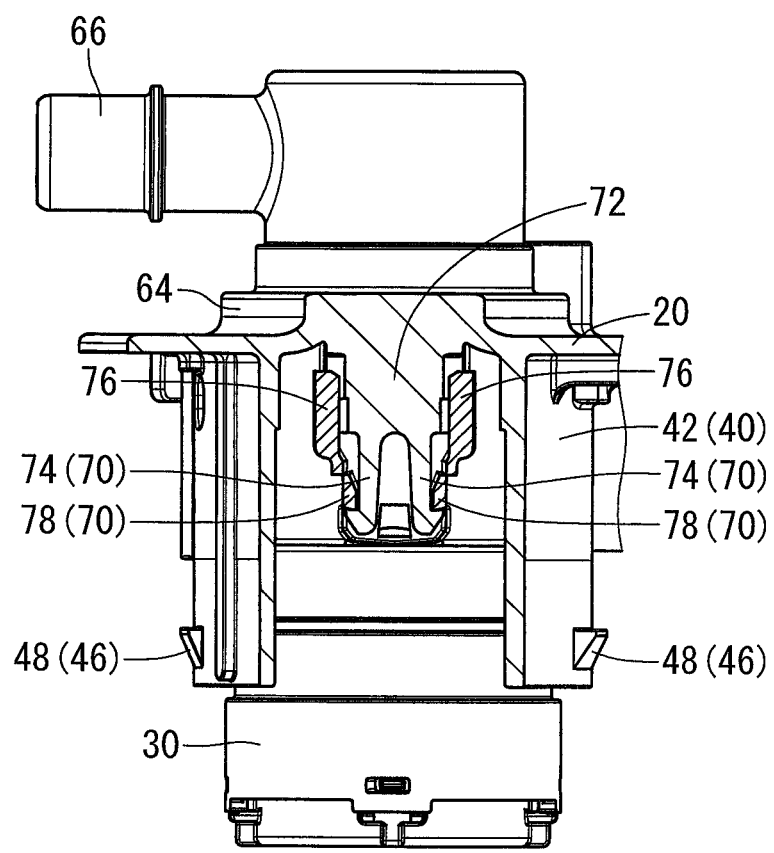
FIG. 10 is a partially cross-sectional view of the fuel-feeding device and the lid member FIG. 7, which illustrates a snap-fit connecting structure between a combination valve device and the lid member.

The combination valve device 30 is attached to the lid member 20 and the upper protective case element 42 of the protective case 40. In particular, the combination valve device 30 is attached to the lid member 20 and the upper protective case element 42 using snap-fit connecting structures (one of which is shown in FIG. 10 as a snap-fit connecting structure 70). The lid member 20 has a support portion 72 formed therein. The support portion 72 of the lid member 20 projects from the lid member 20 and extends downward along an inner circumferential surface of the upper protective case element 42. Further, the support portion 72 has a pair of cantilevered engagement strips or hooks 74 formed in a lower or distal end thereof. The engagement hooks 74 are configured to be oppositely flexed (expanded and contracted). Conversely, the combination valve device 30 has a receiving portion 76 formed in a circumferential surface thereof. The receiving portion 76 of the combination valve device 30 is configured such that the support portion 72 of the lid member 20 may be inserted thereinto. The receiving portion 76 has a pair of shouldered portions 78 formed in a lower portion thereof. The shouldered portions 78 are configured such that the engagement hooks 74 of the support portion 72 engage them when the support portion 72 of the lid member 20 is inserted into the receiving portion 76, so that the snap-fit connecting structure 70 is formed therebetween. Therefore, when the communication valve device 30 is pressed toward the lid member 20 such that the support portion 72 of the lid member 20 is inserted into the receiving portion 76 of the combination valve device 30, the engagement hooks 74 of the support portion 72 engage the shouldered portion 78 of the receiving portion 76, so as to form the snap-fit connecting structure 70 therebetween. Thus, the combination valve device 30 is attached to the lid member 20 and the upper protective case element 42 of the protective case 40.

The lid member 20 has a valve receiving portion 64 integrally formed therein. The valve receiving portion 64 is configured such that an upper portion of the combination valve device 30 is fitted therein when the combination valve device 30 is attached to the lid member 20. Further, the lid member 20 has an evaporated fuel feeding port 66, a fuel discharging port 67 and an electrical connector 68. The evaporated fuel feeding port 66 is used for feeding evaporated fuel controlled by the evaporated fuel control valve of the combination valve device 30 to a canister (not shown). The fuel discharging port 67 is used for feeing the fuel pumped from the sub-tank 36 by the fuel pump 34 to a fuel feeding system (not shown) of the engine. Further, the electrical connector 68 is used for supplying electricity to the fuel pump 34 or other such electrically driven devices.

In order to install the fuel-feeding device 18 into the fuel tank 12, the combination of the fuel-feeding device 18 and the lid member 20 is formed (FIG. 3). Thereafter, the combination of the fuel-feeding device 18 and the lid member 20 are positioned above the opening 22 of the fuel tank 12. In this condition, as shown in FIG. 3, the left side of the lower unit 26 is lowered due to rotation of the lower unit 26 about the rotation axis C, so that the fuel-feeding device 18 may be vertically elongated as a whole. Further, the lower unit 26 is vertically maximally spaced away from the upper unit 24 because the connecting member 28 is lowered to its lowermost position by the spring force of the compression coil spring 62.

The combination of the fuel-feeding device 18 and the lid member 20 are then be lowered toward the opening 22 of the fuel tank 12, so that the fuel-feeding device 18 is introduced into the fuel tank 12 via the opening 22. When the combination of the fuel-feeding device 18 and the lid member 20 is further lowered after the left side of the lower unit 26 contacts the lower wall portion 16 of the fuel tank 12, the lower unit 26 is rotated about the rotation axis C while the left side of the lower unit 26 slides leftward on the lower wall portion 16. As a result, the lower unit 26 is horizontally positioned on the lower wall portion 16. In this condition, when the combination of the fuel-feeding device 18 and the lid member 20 is pressed downward, the upper unit 24 attached to the lid member 20 is lowered toward the lower unit 26 along the connecting member 28 against the spring force of the compression coil spring 62. Upon engagement of the lid member 20 to the opening 22, the lid member 20 is secured to the fuel tank 12, so that the fuel-feeding device 18 is installed in the fuel tank 12 (FIGS. 1 and 2).

According to the embodiment, the fuel tank unit 10 includes the cylindrical protective case 40 attached to the lid member 20 and configured to circumferentially enclose the combination valve device 30. Therefore, when the fuel-feeding device 18 is introduced into the fuel tank 12 via the opening 22, the combination valve device 30 is prevented from directly contacting a periphery of the opening 22, so as to be prevented from being damaged.

Further, the protective case 40 is configured to entirely enclose (encircle) the outer circumferential surface of the combination valve device 30 with an annular space therebetween. Therefore, even if the protective case 40 is deformed by an external force applied thereto when the fuel-feeding device 18 is introduced into the fuel tank 12, the combination valve device 30 is prevented from being directly affected by deformation of the protective case 40, so as to be appropriately protected.

Further, in the protective case 40, the lower protective case element 44 is coupled to the upper protective case element 42 with the upper portion of the lower protective case element 44 surrounding the lower portion of the upper protective case element 42. That is, the lower protective case element 44 is coupled to the upper protective case element 42, such that the protective case 40 has the annular shoulder faced upward. This means that the protective case 40 does not have an annular shoulder surface faced in an insertion direction of the fuel-feeding device 18 into the fuel tank 12. As a result, when the fuel-feeding device 18 is introduced into the fuel tank 12, the protective case 40 is effectively prevented from interfering with the periphery of the opening 22. Therefore, the fuel-feeding device 18 may be smoothly introduced into the fuel tank 12.

Further, the lower unit 26 is vertically movably coupled to the upper unit 24 (the protective case 40) via the connecting member 28. Therefore, even when the upper wall portion 14 and the lower wall portion 16 of the fuel tank 12 may move relative to each other due to change of the inner pressure of the fuel tank 12, the fuel-feeding device 18 accommodates the relative motion of the upper wall portion 14 and the lower wall portion 16.

Further, in the protective case 40, the snap-fit connecting structure 46 positioning and connecting the upper protective case element 42 and the lower protective case element 44 may be configured to have looseness or backlash in a vertical direction. Such looseness of the snap-fit connecting structure 46 functions to accommodate the relative motion of the upper wall portion 14 and the lower wall portion 16.

Naturally, various changes and modifications may be made to the fuel tank unit 10. For example, in this embodiment, the protective case 40 may be composed of two elements, i.e., the upper protective case element 42 and the lower protective case element 44. However, the protective case 40 may be integrally formed as an undivided single element. To the contrary, the protective case 40 may be composed of three or more elements.

Further, in this embodiment, the upper protective case element 42 and the lower protective case element 44 of the protective case 40 are connected by the snap-fit connecting structure 46. However, an adhesive bonding structure may be used instead of the snap-fit connecting structure 46 as necessary.

Further, in this embodiment, the protective case 40 is made of resin. However, the protective case 40 may be made of steel or other such metals.

Further, in this embodiment, the upper unit 24 and the lower unit 26 are positioned on opposite sides of the connecting member 28. However, the upper unit 24 and the lower unit 26 may be positioned on the same side of the connecting member 28.

A representative example of the present disclosure has been described in detail with reference to the attached drawings. This detailed description is merely intended to teach a person of skill in the art further details for practicing preferred aspects of the present disclosure and is not intended to limit the scope of the disclosure. Only the claims define the scope of the claimed disclosure. Therefore, combinations of features and steps disclosed in the foregoing detailed description may not be necessary to practice the disclosure in the broadest sense, and are instead taught merely to particularly describe detailed representative examples of the disclosure. Moreover, the various features taught in this specification may be combined in ways that are not specifically enumerated in order to obtain additional useful embodiments of the present disclosure.

What is claimed is:

1. A fuel tank unit, comprising:
    a lid member configured to close an opening of a fuel tank; and
    an upper unit coupled to the lid member, wherein the upper unit includes a combination valve device configured to be introduced into the fuel tank via the opening of the fuel tank and configured to function as an evaporated fuel control valve and a full limit valve,
    wherein the lid member includes a cylindrical protective case configured to protect the combination valve device of the upper unit when the combination valve device is introduced into the fuel tank via the opening, and
    wherein the protective case has a lower open end and is configured to entirely enclose an outer circumferential surface of the combination valve device with a space therebetween while in fluid communication with the fuel tank via the lower open end of the protective case and the space between the protective case and the combination valve device.

2. The fuel tank unit of claim 1, further comprising a lower unit positioned below the upper unit and including one or more fuel-feeding components,
    wherein the lower unit is connected to the protective case with a connecting member, and
    wherein the protective case includes rail portions coupled to the connecting member.

3. The fuel tank unit of claim 2, wherein the cylindrical protective case is vertically divided so as to comprise of an upper protective case element and a lower protective case element,
    wherein the upper protective case element is integrally connected to the lid member,
    wherein the upper protective case element and the lower protective case element are coupled together with a snap-fit connecting structure, and
    wherein the rail portions are disposed on the lower protective case element.

4. The fuel tank unit of claim 3, wherein the upper protective case element is coupled to the lower protective case element by mating engagement, and
    wherein the lower protective case element is positioned outside of the upper protective case element.

5. The fuel tank unit of claim 2, wherein the protective case is positioned on an attachment surface of the connecting member opposite to an attachment surface of the connecting member to which the lower unit is attached.

* * * * *